Nov. 7, 1961 B. L. MIMS ET AL 3,008,061
SLOW SPEED MOTOR
Filed April 21, 1959

INVENTORS
BRUCE L. MIMS
HENRY KONET
BY Henry L. Scenies
ATTORNEY

United States Patent Office 3,008,061
Patented Nov. 7, 1961

1

3,008,061
SLOW SPEED MOTOR
Bruce L. Mims, Danbury, Conn., and Henry Konet, Hohokus, N.J., assignors to The Barden Corporation, Danbury, Conn., a corporation of Connecticut
Filed Apr. 21, 1959, Ser. No. 807,820
7 Claims. (Cl. 310—83)

Our invention relates to a slow speed motor and more particularly to an improved slow speed motor which is smaller, lighter, and more compact than motors of the prior art.

In many instances it is desirable that a shaft be driven from a motor at a slow speed with a relatively high torque. A motor which is constructed to accomplish this result is inordinately large for most applications and in many cases is entirely impracticable. A possible solution to the problem of driving a shaft from an ordinary motor at a slow speed with a relatively high torque is the use of a speed reducer of a type known in the art driven by the output shaft of the motor. While this solution may be a satisfactory one for most applications, the weight of the assembly and the space occupied by the combination make the solution an unsatisfactory one for installations in which small size and light weight of components are of paramount importance.

We have invented a slow speed motor for driving its output shaft at a slow speed with a relatively high torque. Our motor is small and light as compared with assemblies of the prior art which are capable of accomplishing a similar result. Our motor may be constructed as a simple, compact unit.

One object of our invention is to provide a slow speed motor for driving its shaft at a slow speed with a relatively high torque.

A further object of our invention is to provide a slow speed motor which is small and which is lighter than assemblies of the prior art for driving a shaft at a slow speed with a relatively high torque.

Another object of our invention is to provide a slow speed motor which may be manufactured as a simple, compact unit.

Other and further objects of our invention will appear from the following description.

In general our invention contemplates the provision of a slow speed motor having a housing carrying the motor stator. We employ a first rolling bearing for mounting the motor rotor on the housing. A second rolling bearing supports an output shaft on the rotor. We provide a common retainer for the rolling elements of the bearings. The bearings of our motor have differing characteristics to provide a speed reduction from the rotor to the output shaft when the stator is energized to drive the rotor. The bearing which mounts the rotor or the housing performs the function of supporting the rotor while contributing to the provision of a speed reduction from the rotor to the output shaft.

In the accompanying drawings which form part of the instant specification and which are to be read in conjunction therewith and in which like reference numerals are used to indicate like parts in the various views.

Figures 1, 2:
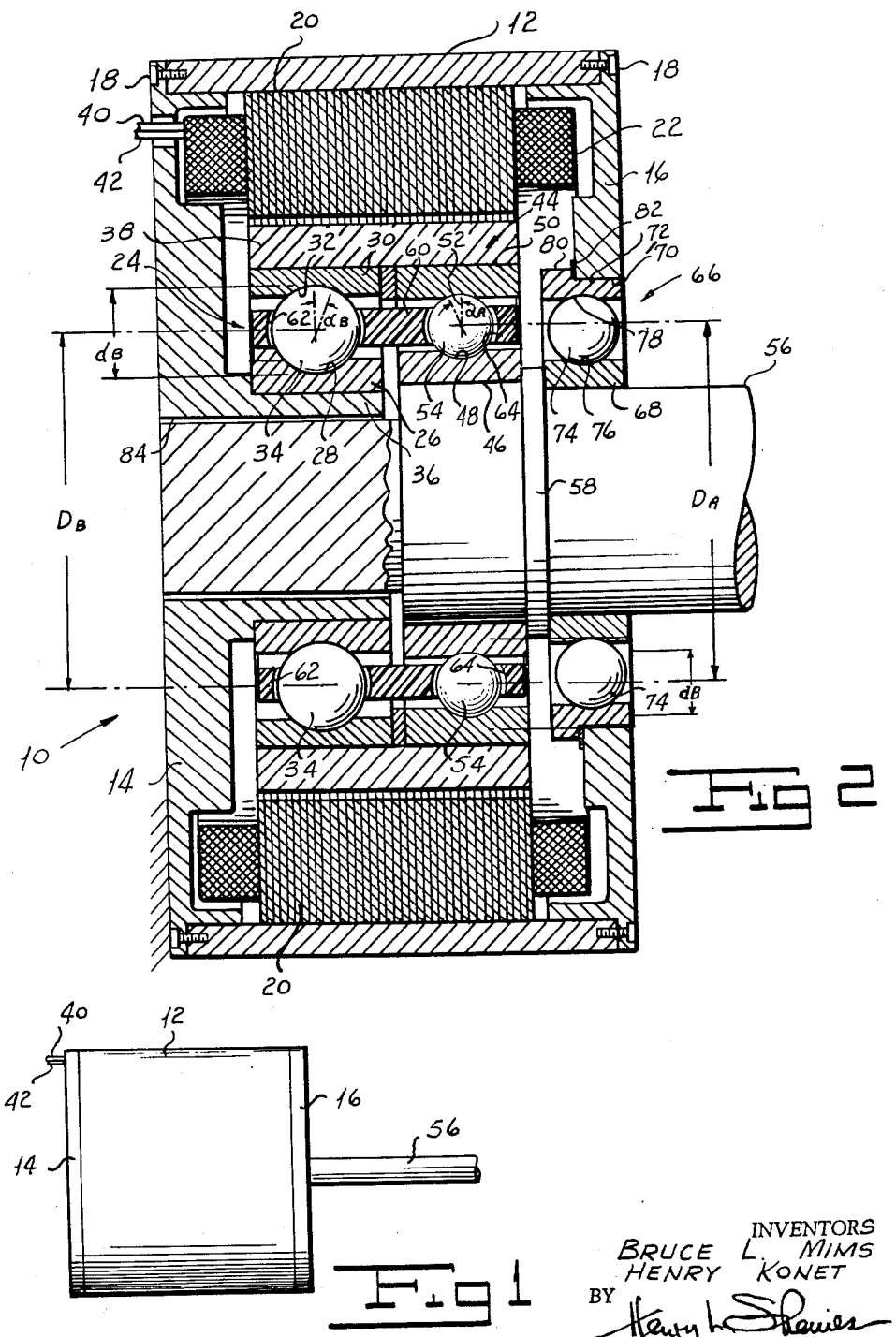
FIGURE 1 is an elevation of our slow speed motor.
FIGURE 2 is a sectional view of our slow speed motor drawn on an enlarged scale.

Referring now more particularly to the drawings, our motor, indicated generally by the reference character 10, includes a cylindrical housing 12 provided with respective end plates 14 and 16 secured to the housing by any convenient means such as screws 18 or the like. We mount a motor stator including a stack of laminations 20 within the housing 12. The laminations 20 carry a stator winding 22 which may be any suitable type known to the art.

A first bearing, indicated generally by the reference character 24, has an inner ring 26 formed with a race 28 and an outer ring 30 formed with a race 32. We mount rolling elements such as balls 34 between rings 26 and 30 in races 28 and 32. We mount the inner ring 26 of bearing 24 on an annular boss 36 formed on the plate 14. We employ any suitable means for securing the outer ring 30 of bearing 24 to the rotor 38 of our motor for rotation with the rotor. Rotor 38 may be in the form of a cylindrical sleeve formed from a suitable magnetic material to provide a hysteresis motor, or it may be formed from a conducting material to provide an induction motor. Alternatively, if desired, we could shrink a squirrel cage onto the ring 30 to provide a squirrel cage motor. When winding 22 is energized from any suitable source (not shown) of alternating current through conductors 40 and 42, it produces a rotating magnetic field to cause rotor 38 to rotate on the bearing 24.

Our motor includes a second bearing, indicated generally by the reference character 44, having an inner ring 46 formed with a race 48 and an outer ring 50 formed with a race 52. We dispose rolling elements such as balls 54 between rings 46 and 50 in races 48 and 52. It is to be understood, of course, that the outer races may be formed in the rotor 38 per se instead of using separate rings.

The rotor 38 carries the ring 50 for rotation therewith. We may accomplish this by any suitable means such, for example, as by shrinking the rotor 38 on both outer rings 30 and 50. We mount the inner ring 46 of bearing 44 on an output shaft 56 provided with a boss 58 in engagement with ring 46. A common retaining ring 60 formed with openings 62 for receiving the balls 34 of bearing 24 and with openings 64 for receiving the balls 54 of bearing 44 provides a driving connection between the two sets of balls.

We employ a third bearing, indicated generally by the reference character 66, for supporting shaft 56 on the plate 16. We mount the inner ring 68 of bearing 66 on the shaft 56 adjacent the boss 58. We form plate 16 with an opening 70 for receiving the outer ring 72 of bearing 66. We dispose rolling elements such as balls 74 in respective races 76 and 78 formed in rings 68 and 72. We provide the ring 72 with an annular shoulder 80, and we dispose a shim 82 between the shoulder 80 and the inner surface of plate 16 to load the bearings of our motor. We provide the plate 14 with a central opening 84 through which shaft 56 extends.

To explain the manner in which our motor achieves a reduction in speed from the rotor 38 to the output shaft 56, let us assume that:

$D_A$=The pitch diameter of bearing 44.
$D_B$=The pitch diameter of bearing 24.
$d_A$=The ball diameter of balls 54.
$d_B$=The ball diameter of balls 34.
$\alpha_A$=The contact angle of balls 54.
$\alpha_B$=The contact angle of balls 34.
$n_c$=The speed of rotation of the common cage 60.
$n_0$=The speed of rotation of rings 26 and 46 if both these rings were free to rotate.

It is well known that the relation of cage speed to the outer and inner ring speeds of a bearing may be expressed by the relationship:

(1)   $n_c = \frac{1}{2}[n_0 + n_1 + (n_0 - n_1)d/D \cos \alpha]$

Relating Equation 1 to the bearing 44, we may write:

(2)   $n_{cA} = \frac{1}{2}[n_0 + n_{1A} + (n_0 - n_{1A})d_A/D_A \cos \alpha_A]$ Since the inner ring 26 of the bearing 24 is held stationary on boss 36 of plate 14, its speed is zero and for this bearing we may write:

(3) $\quad n_{cB}=n_o/2[1+d_B/D_B \cos \alpha_B]$

Since both the bearings 44 and 24 share a common cage, $n_{cA}=n_{cB}$. Equating the righthand sides of Equations 2 and 3 and solving for the ratio of the speed of shaft 56, carried by ring 46 to the speed of rings 30 and 50, carried by rotor 38, we obtain:

(4) $\quad n_{iA}/n_0 = \dfrac{d_B/D_B \cos \alpha_B - d_A/D_A \cos \alpha_A}{1 - d_A/D_A \cos \alpha_A}$ From Equation 4 it is apparent that if the two bearings 44 and 24 are identical, then the speed of shaft 56 is zero, representing an infinite speed reduction. The speed of shaft 56 is determined in accordance with Equation 4 by the relative characteristics of the bearings 24 and 44. A predetermined speed of shaft 56 with respect to rotor 44 may be achieved by varying any one of the characteristics of ball diameter, pitch diameter, or ball contact angle of one bearing with respect to the other bearing. In the event that the result produced by substituting values in Equation 4 has a minus sign, the direction of rotation of shaft 56 will be opposite to the direction of rotation of rotor 38. In the particular embodiment of our invention shown in FIGURE 2 the balls 54 have a smaller diameter than do the balls 34. Further the housing 12 in the form of the invention shown is stationary.

In use of our motor we construct the motor in the manner shown by assemblying all the parts within housing 12. As is explained hereinabove, the rotor 38 may be formed of magnetic material to provide a hysteresis motor, or it may be formed of conducting material to provide an induction motor. If desired, a squirrel cage rotor could be shrunk onto the outer rings 30 and 50. We construct the bearings 24 and 44 to have such relative characteristics that the shaft 56 rotates at a predetermined speed reduction with relation to the rotor 38.

It will be seen that we have accomplished the objects of our invention. We have provided a motor which is adapted to drive a shaft at a slow speed with a relatively high torque. Our motor is much smaller and more compact than are slow speed arrangements of the prior art. Our motor may be constructed as a simple integral unit. It is of particular utility in applications in which light weight and small size are paramount considerations.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A slow speed motor including in combination a stator, a rotor, electromagnetic means adapted to be energized to cause relative rotation between said rotor and stator, a first bearing having a pair of races and rolling elements disposed between the races for mounting said rotor for rotation with respect to said stator under the influence of said electromagnetic means, a second bearing having first and second races and rolling elements between said first and second races, a common retainer for said rolling elements and means mounting the first race of said second bearing on one of said stator and rotor to provide a predetermined speed ratio between said rotor and said second race of said second bearing and an output shaft carried by said second race.

2. A slow speed motor including in combination, a stator, a rotor, electromagnetic means adapted to be energized to cause relative rotation between said rotor and stator, a first bearing having first and second races and rolling elements disposed between said races, a second bearing having first and second races and rolling elements disposed between said races, a common retainer for said rolling elements, means mounting the first races of said bearings on one of said rotor and stator, means mounting the second race of one of said bearings on the other one of said rotor and stator, and an output shaft carried by the second race of the other of said bearings.

3. A slow speed motor including in combination a stator, a rotor, electromagnetic means adapted to be energized to cause relative rotation between said rotor and stator, a first bearing having first and second races and rolling elements disposed between said races, said first bearing being constructed with predetermined characteristics, a second bearing having first and second races and rolling elements disposed between said races, said second bearing being constructed with at least one characteristic differing from the corresponding characteristic of the other bearing, a common retainer for the rolling elements of said bearings, means mounting the first races of said bearings on one of said rotor and stator, means mounting the second race of one of said bearings on the other one of said rotor and stator and an output shaft carried by the second race of the other of said bearings.

4. A slow speed motor including in combination a housing, a stator disposed in said housing, a rotor, electromagnetic means adapted to be energized to cause relative rotation between the rotor and stator, a first bearing having a pair of races and rolling elements disposed between the races for mounting said rotor for rotation within the housing, a second bearing disposed within said housing, said second bearing having first and second races and rolling elements disposed between said races, a common retainer for the rolling elements of said bearings, means mounting said first race on one of said stator and rotor to provide a predetermined speed ratio between said rotor and said second race and an output shaft carried by said second race.

5. A slow speed motor including in combination a housing, a stator disposed in said housing, a rotor, electromagnetic means adapted to be energized to produce relative rotation between the rotor and stator, a first bearing having a pair of races and rolling elements disposed between the races for mounting said rotor for rotation within the housing, said first bearing being constructed with predetermined characteristics, a second bearing disposed within said housing, said second bearing having first and second races and rolling elements disposed between said races, a common retainer for the rolling elements of said bearings, said second bearing being constructed with at least one characteristic differing from the corresponding predetermined characteristic of the first bearing, and means mounting said first race on one of said stator and rotor to provide a predetermined speed ratio between said rotor and said second race and an output shaft carried by said second race.

6. A slow speed motor including in combination a housing, a stator disposed in said housing, a rotor, electromagnetic means adapted to be energized to produce relative rotation between the rotor and stator, a first bearing having a pair of races and rolling elements disposed between the races for mounting said rotor for rotation within the housing, said first bearing being constructed with predetermined characteristics, a second bearing disposed within said housing, said second bearing having first and second races and rolling elements disposed between said races, a common retainer for the rolling elements of said bearings, said second bearing being constructed with at least one characteristic differing from the corresponding predetermined characteristic of the first bearing, and means mounting said first race on one of said stator and rotor to provide a predetermined speed ratio between said rotor and said second race, an output shaft carried by said second race and a third bearing disposed between said shaft and said housing.

7. A slow speed motor including in combination a housing, a stator carried by the housing within the housing, first and second bearings disposed within said housing, each of said bearings comprising a first race and a second race and rolling elements disposed between said races, a rotor disposed within said housing, means mounting said rotor on the first races of said bearings for movement therewith, means securing the second race of one of said bearings to said housing to mount said rotor for movement within said housing, an output shaft, means securing said output shaft to the second race of the other one of said bearings, said bearings having diverse characteristics and electromagnetic means disposed within said housing and adapted to be energized to produce relative rotation between said stator and said rotor.

References Cited in the file of this patent

UNITED STATES PATENTS

| | | |
|---|---|---|
| 2,450,290 | Maxwell | Sept. 28, 1948 |
| 2,467,870 | Stephenson | Apr. 19, 1949 |
| 2,853,899 | Graham | Sept. 30, 1958 |

FOREIGN PATENTS

| | | |
|---|---|---|
| 52,181 | Sweden | June 22, 1917 |